United States Patent
Levy et al.

(10) Patent No.: US 8,652,277 B2
(45) Date of Patent: Feb. 18, 2014

(54) WEAKLY OXIDIZING AMMONIUM NITRATE COMPOSITE MATERIALS AND METHODS FOR PREPARING SUCH COMPOSITIONS

(75) Inventors: Alan B. Levy, Randolph, NJ (US); James A. Kweeder, Chesterfield, VA (US); Jose Carrazza, Millburn, NJ (US); Kenneth D. Kunz, Midlothian, VA (US)

(73) Assignee: Honeywell International Inc., Morristown, NJ (US)

( * ) Notice: Subject to any disclaimer, the term of this patent is extended or adjusted under 35 U.S.C. 154(b) by 440 days.

(21) Appl. No.: 13/026,834

(22) Filed: Feb. 14, 2011

(65) Prior Publication Data

US 2011/0132051 A1   Jun. 9, 2011

Related U.S. Application Data

(62) Division of application No. 12/499,598, filed on Jul. 8, 2009.

(60) Provisional application No. 61/080,898, filed on Jul. 15, 2008.

(51) Int. Cl.
  *C06B 21/00* (2006.01)
(52) U.S. Cl.
  USPC ........................................................ 149/109.6
(58) Field of Classification Search
  USPC ............................................ 149/109.6, 19.92
  See application file for complete search history.

(56) References Cited

U.S. PATENT DOCUMENTS

| 3,223,518 | A |   | 12/1965 | Hansen |
| 3,366,468 | A |   | 1/1968 | Porter |
| 4,124,368 | A |   | 11/1978 | Boyars |
| 4,409,016 | A |   | 10/1983 | Mutsers et al. |
| 4,913,725 | A | * | 4/1990 | Nishikawa et al. ........... 504/274 |
| 6,372,191 | B1 |   | 4/2002 | Mendenhall et al. |
| 6,641,622 | B2 |   | 11/2003 | Sampson et al. |

(Continued)

FOREIGN PATENT DOCUMENTS

| EP | 0 070 056 B1 | 1/1983 |
| EP | 0 104 706 B1 | 4/1984 |

(Continued)

OTHER PUBLICATIONS

P.M. Zaitsev et al., "Thermal stability of components of mineral fertilizers. Report 1. Nitrates, chlorides, fluorides, silicofluorides, phosphates of ammonium, potassium, calcium, aluminum, and iron," Trudy NIUIFa, 1982, 240, 154-66 (Abstract only.

(Continued)

*Primary Examiner* — Aileen B Felton
(74) *Attorney, Agent, or Firm* — Faegre Baker Daniels LLP

(57) ABSTRACT

A method forms a relatively stable ammonium nitrate composite material. The method includes (a) blending ammonium nitrate with an average particle diameter greater than about 1 mm and a substantially non-oxidizing compound in fine particle form; and (b) reducing the average size of said ammonium nitrate granules in the presence of the non-oxidizing compound in fine particle form to produce a substantially homogeneous blend of ammonium nitrate and the non-oxidizing compound having an average particle diameter of about 1 to about 1,000 μm to form a substantially non-explosive powder.

20 Claims, 8 Drawing Sheets

(56) References Cited

U.S. PATENT DOCUMENTS

| | | | |
|---|---|---|---|
| 6,641,662 | B2 * | 11/2003 | Radojevic et al. ............... 117/2 |
| 7,014,828 | B2 | 3/2006 | Hero et al. |
| 7,147,830 | B2 | 12/2006 | Hero et al. |
| 2007/0199357 | A1 | 8/2007 | Kweeder et al. |

FOREIGN PATENT DOCUMENTS

| | | |
|---|---|---|
| EP | 0070056 B1 | 9/1985 |
| EP | 0104706 B1 | 3/1986 |
| EP | 0 229 421 B1 | 7/1987 |
| EP | 0229421 B1 | 3/1990 |
| FR | 1 467 831 | 2/1967 |
| FR | 1467831 A | 2/1967 |
| FR | 2 295 915 B1 | 2/1979 |
| FR | 2295915B1 B1 | 2/1979 |
| WO | 00/07938 A1 | 2/2000 |
| WO | WO00/07938 A1 | 2/2000 |
| WO | 2007084872 | 7/2007 |
| WO | 2007084873 | 7/2007 |
| WO | WO2007/084872 A2 | 7/2007 |
| WO | WO2007/084873 A2 | 7/2007 |

OTHER PUBLICATIONS

Zhao et al., Rapid Commun. Mass Spectrom. 2002; 16: 1137-1146.
C. Reeder et al., "Ammonium Nitrate Trends," Chemical Engineering Progress, May 1968, vol. 64, No. 5, pp. 49-53.
P.M. Zaitsev et al., "Thermal stability of compounents of mineral fertilizers. Report 1, Nitrates, chlorides, fluorides, silicofluorides, phosphates of ammonium, potassium, calcium, aluminum, and iron," Trudy NIUIFa, 1982, 240, 154-66 (abstract only).
Restriction Requirement mailed Feb. 1, 2011 in related U.S. Appl. No. 12/499,598.
Election filed Feb. 14, 2011 in related U.S. Appl. No. 12/499,598.
Office Action mailed Mar. 31, 2011 in related U.S. Appl. No. 12/499,598.
Amendment filed Jun. 30, 2011 in related U.S. Appl. No. 12/499,598.
Notice of Non-Compliance mailed Jul. 15, 2011 in related U.S. Appl. No. 12/499,598.
Supplemental Amendment filed Jul. 21, 2011 in related U.S. Appl. No. 12/499,598.
Final Office Action mailed Aug. 10, 2011 in related U.S. Appl. No. 12/499,598.
Amendment filed Dec. 7, 2011 in related U.S. Appl. No. 12/499,598.
Office Action mailed Jan. 19, 2012 in related U.S. Appl. No. 12/499,598.
Amendment filed Mar. 22, 2012 in related U.S. Appl. No. 12/499,598.
Final Office Action mailed Apr. 5, 2012 in related U.S. Appl. No. 12/499,598.
Amendment filed Jul. 20, 2012 in related U.S. Appl. No. 12/499,598.
Office Action mailed Oct. 29, 2012 in related U.S. Appl. No. 12/499,598.
Office Action mailed Apr. 25, 2013 in U.S. Appl. No. 12/499,598.

* cited by examiner

WEAKLY OXIDIZING AMMONIUM NITRATE COMPOSITE MATERIALS AND METHODS FOR PREPARING SUCH COMPOSITIONS

RELATED APPLICATION

This is a divisional of U.S. patent application Ser. No. 12/499,598, filed Jul. 8, 2009, currently pending, which claims priority of U.S. Provisional Application No. 61/080,898, filed Jul. 15, 2008, which has expired. The disclosures of U.S. patent application Ser. No. 12/499,598, and U.S. Provisional Application No. 61/080,898 are hereby incorporated by reference.

TECHNICAL FIELD

This disclosure relates to ammonium nitrate composites comprising ammonium nitrate and an oxidation reduction agent and processes for producing such composites.

BACKGROUND

It is well known that, because of the high concentration of nitrate ions, ammonium nitrate (including double salts comprising ammonium nitrate) has important uses in the field of agriculture in general and fertilization in particular. However, it is also well known that ammonium nitrate, in many of the forms in which it has heretofore been commonly used, is relatively difficult and potentially hazardous to handle commercially in large amounts, and/or to store in great masses (such as occur in commercial warehouses and storage bins), especially for relatively long periods of time. Furthermore, it has been known that many of the forms of ammonium nitrate heretofore commonly used have had a tendency to detonate under relatively mild conditions and have, therefore, sometimes been abused and misused as an explosive material.

Several potential solutions to the problem of the explosiveness and/or the detonability of compositions containing ammonium nitrate have been proposed. For example, the use of ammonium nitrate in the form of a double salt with ammonium sulfate for the purpose of reducing the hazardous properties of the ammonium nitrate has been suggested in U.S. Pat. No. 6,689,181, the subject matter of which is incorporated herein by reference. However, the processes used to formulate such double salt-based products are relatively complex. It could therefore be helpful to provide ammonium nitrate composites that are comparatively safe to handle and less complex methods of making such composites.

SUMMARY

We discovered that substantial and unexpected advantages can be achieved by incorporating selected materials or agents into such compositions and similar compositions. Moreover, we discovered that selected stabilizing agents which might otherwise likely not be considered for use in connection with such compositions and, in particular, fertilizer compositions, have a beneficial effect on the characteristics when incorporated into our compositions.

We thus provide methods of forming stable ammonium nitrate composite material including (a) blending ammonium nitrate having an average particle diameter greater than about 1 mm and a substantially non-oxidizing compound in fine particle form; and (b) reducing the average size of said ammonium nitrate in the presence of said non-oxidizing compound to produce a substantially homogeneous blend of ammonium nitrate and the non-oxidizing compound having an average particle diameter of about 1 to about 1000 µm to form a substantially non-explosive powder.

We also provide a non-explosive composition including a substantially homogeneous blend of solid state ammonium nitrate having an average particle diameter of about 1 to about 1000 µm and non-oxidizing particulate matter having an average particle diameter of about 1 to about 1000 µm.

We further provide a method of forming stable ammonium nitrate composite material including (a) reducing the average size of ammonium nitrate having an average particle diameter greater than about 1 mm; and (b) blending said ammonium nitrate with a substantially non-oxidizing compound having an average particle diameter of about 1,000 µm or less to produce a substantially homogeneous blend of ammonium nitrate and said non-oxidizing compound having an average particle diameter of about 1 to about 1,000 µm to form a substantially non-explosive powder.

DETAILED DESCRIPTION

Figure 1:
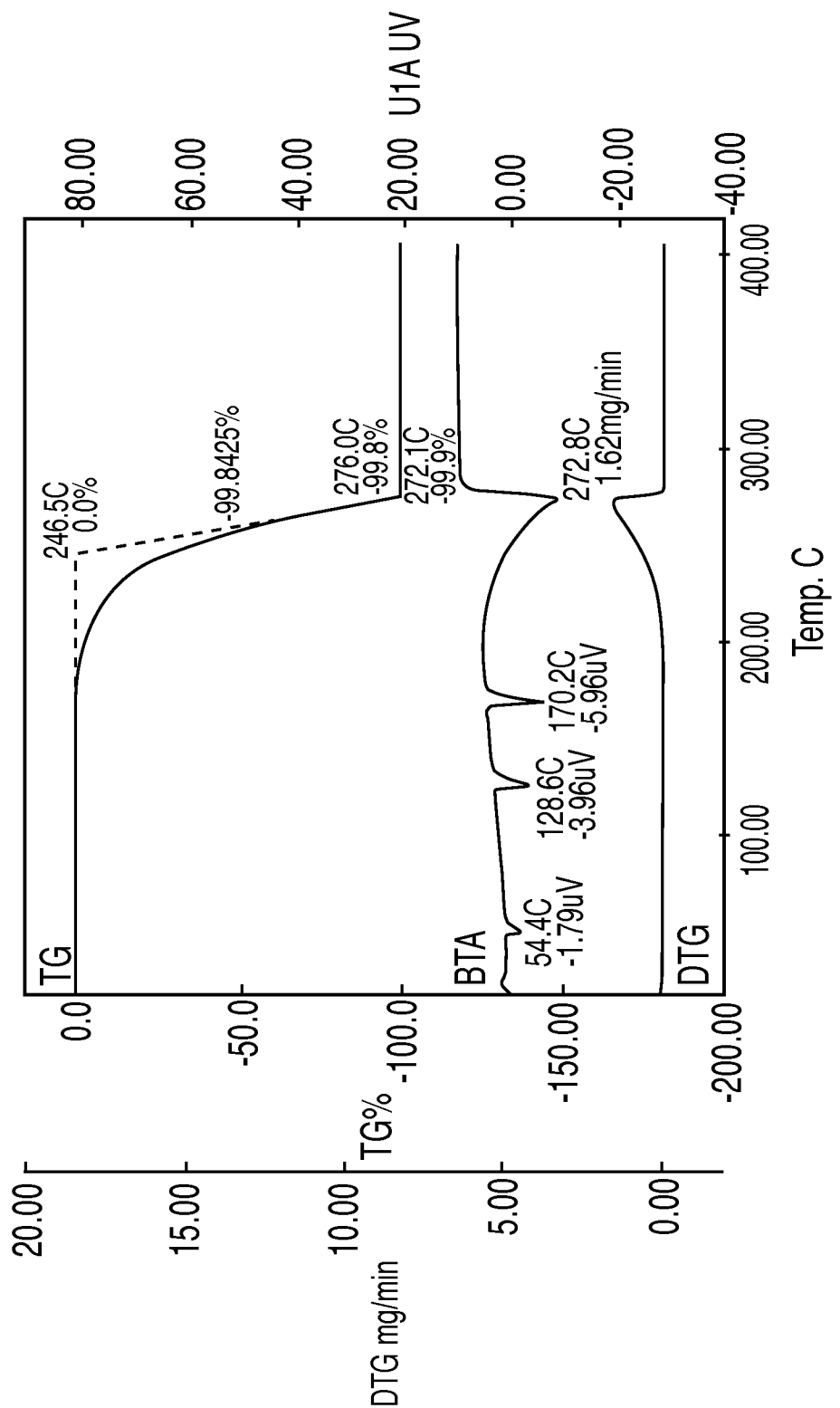
FIG. 1 is a thermogram of DTG and DTA as a function of temperature for a typical ammonium nitrate.

It will be appreciated that the following description is intended to refer to specific examples of tests selected for illustration in the drawings and is not intended to define or limit the disclosure, other than in the appended claims.

We provide methods for forming ammonium nitrate compositions comprising ammonium nitrate and at least a second compound, wherein the second compound preferably has the effect of substantially reducing the oxidative tendencies of ammonium nitrate.

The second compound may be a non-oxidizing salt which is preferably incorporated into the composite by intimately mixing fine particles of ammonium nitrate with fine particles of the at least one second compound. As used herein, the term "fine particle" refers to particles and collections of particles having an average particle size of about 1000 µm or less.

We found that beneficial effects exhibited for ammonium nitrate:ammonium sulfate 1:2 double salt can be achieved by incorporating a non-oxidizing salt into ammonium nitrate, without having to crystallize a double salt, by forming intimate mixtures of fine particles of the two components. Such a fine mixing of fine particles acts as an effective non-oxidizing diluent for the ammonium nitrate particles and approach the properties exhibited by the 1:2 double salt. However, the 1:2 double salt may be crystallized whenever desired. It is also possible for the 1:3 double salt to be produced, although this is less desired.

Since our methods are adaptable for use with any non-oxidizing and/or weakly oxidizing salts, it is possible to create composite materials having precisely tailored nutrient compositions for use as fertilizer in particular.

We also provide for the subsequent processing of the fine particle composites such as by compacting and/or granulating to produce a product having particle sizes and other properties selected by the user/customer without losing the low-oxidation advantage of the basic composite material. The fine particles are preferably fine powders.

The methods may comprise forming fine particles of ammonium nitrate, forming fine particles of a second compound, mixing the fine particles to a desired substantially homogeneous composition, and then granulating the homogeneous composition to produce a material comprising granules of the desired size.

The second compound may be selected from at least from the group consisting of: non-oxidative or low-oxidative ammonium salts such as ammonium sulfate, ammonium phosphate, ammonium molybdenate, ammonium hexaflourosilicate and the like; non-oxidative or low-oxidative calcium salts such as calcium nitrate, calcium carbonate and the like; non-oxidative or low-oxidative potassium salts such as potassium nitrate, potassium phosphate and the like; and other salts such as magnesium nitrate, neodymium hydroxynitrate and the like.

As used herein, the term "ammonium nitrate composition" refers broadly to compositions which comprise ammonium nitrate in any form.

The composites may have a wide range of relative ammonium nitrate:second compound concentrations. However, the mole ratio of ammonium nitrate to the second compound is preferably from about 0.8:1 to about 1.2:1, with a molar ratio of about 1:1 being more preferred.

The ammonium nitrate used to form the composites is preferably fertilizer grade material of at least about 90 wt. % purity, more preferably, at least about 95 wt. % purity, and even more preferably at least about 97 wt. % purity. Because of the hazards of mixing organic materials with ammonium nitrate, it is highly desirable that neither the ammonium sulfate nor the second compound contains more than about 0.2 wt. % organic impurities.

One method for forming the composites comprises blending, with low energy input, ammonium nitrate particles of a size readily commercially available, preferably having an average particle diameter of greater than about 1 mm, with fine particles of the low-oxidizing or non-oxidizing second compound, and then granulating the blend to produce a homogeneous blend of fine particles of both ammonium nitrate and the second compound.

This process is preferred due to concern that handling and storage of fine particle size ammonium nitrate, in the absence of the anti-oxidizing compounds, can create conditions in which detonation, deflagration or explosion are relatively more likely. By use of the preferred methods described herein, the ammonium nitrate is diluted with the second compound in fine particle size as the fine particles of ammonium nitrate are formed. The blend of fine particles can then be handled, stored and further processed much more safely.

Many known and available methods for granulating particles can be used. The granulation process may comprise providing the blend of fine particles comprising ammonium nitrate and the second compound and introducing the blend of particles to a granulator containing a non-thermoreactive acids or mixture of acids such as sulfuric acid and/or nitric acid, in an ammoniating environment, wherein ammonium sulfate at least partially covers or coats particles or groups of particles forming the blend of fine particles. This causes agglomeration or growth of particles that further include ammonium sulfate coatings that can further improve the safety of the composite material. Those skilled in the art, in view of these teachings, can adapt this granulation technique and other known granulation techniques to produce materials having the properties, including the particle size, desired for a particular fertilizer application.

Alternatively, our method can include (a) reducing the average size of ammonium nitrate having an average particle diameter greater than about 1 mm; and (b) blending said ammonium nitrate with a substantially non-oxidizing compound having an average particle diameter of about 1,000 μm or less to produce a substantially homogeneous blend of ammonium nitrate and said non-oxidizing compound having an average particle diameter of about 1 to about 1,000 μm to form a substantially non-explosive powder.

Given the formation of a relatively stable ammonium nitrate composite particles, our methods also include the step of compacting the particles.

EXAMPLES

Comparative Example 1

Fused ammonium nitrate (AN) was tested using Seiko Instruments SSC-5200 that collects Differential Thermal Analysis (DTA) data simultaneously with the Thermogravimetric Analysis (TGA) data. The resulting thermogram in FIG. 1 is very similar to a Differential Scanning Calorimetry (DSC) scan and can be used to identify thermal events and the temperature of those events. FIG. 1 illustrates typical results from testing of AN, showing its relative instability and oxidation potential.

Comparative Example 2

Figure 2:
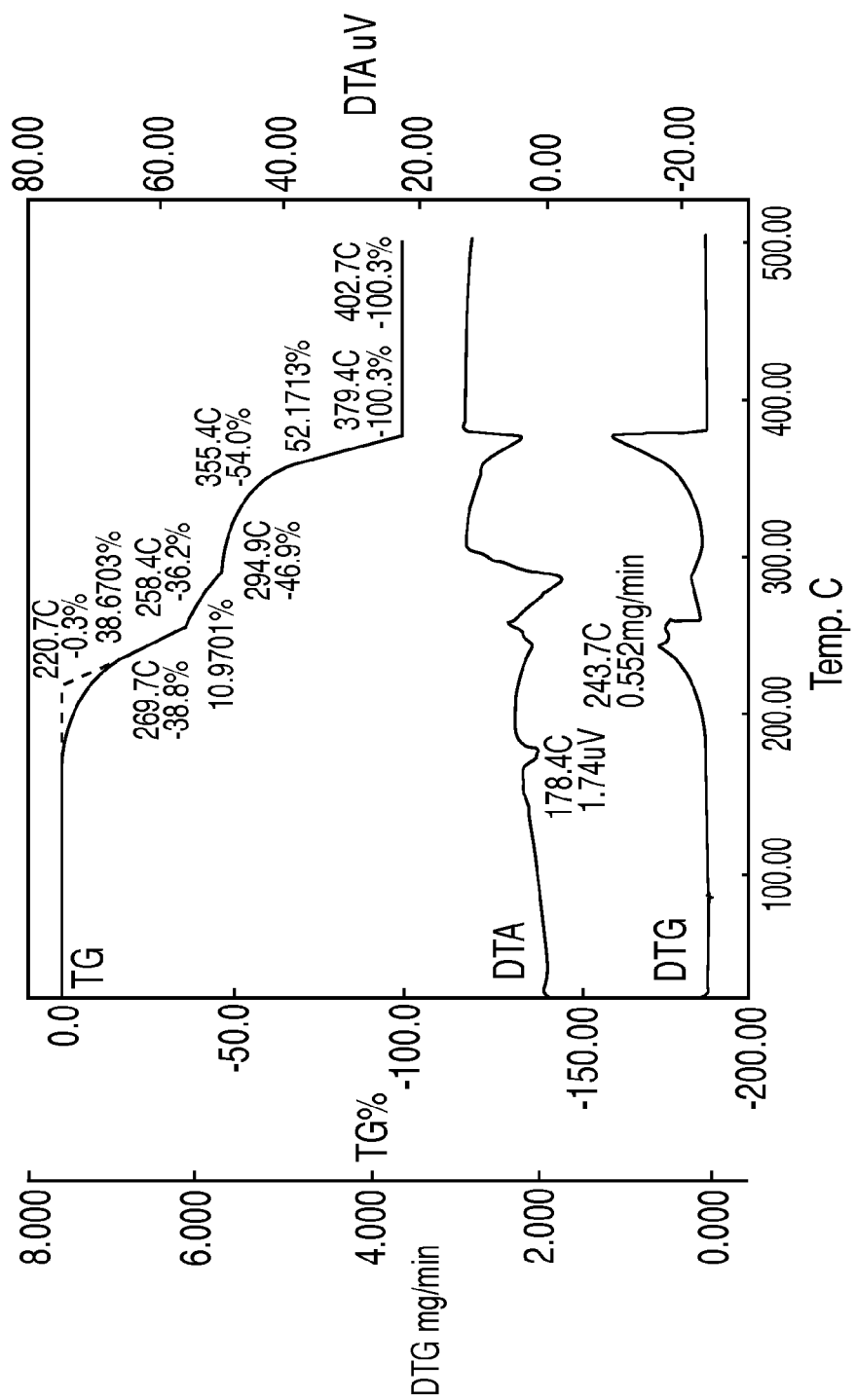
FIG. 2 is a thermogram of DTG and DTA as a function of temperature for ammonium nitrate sulfate double salt.
Figure 3:
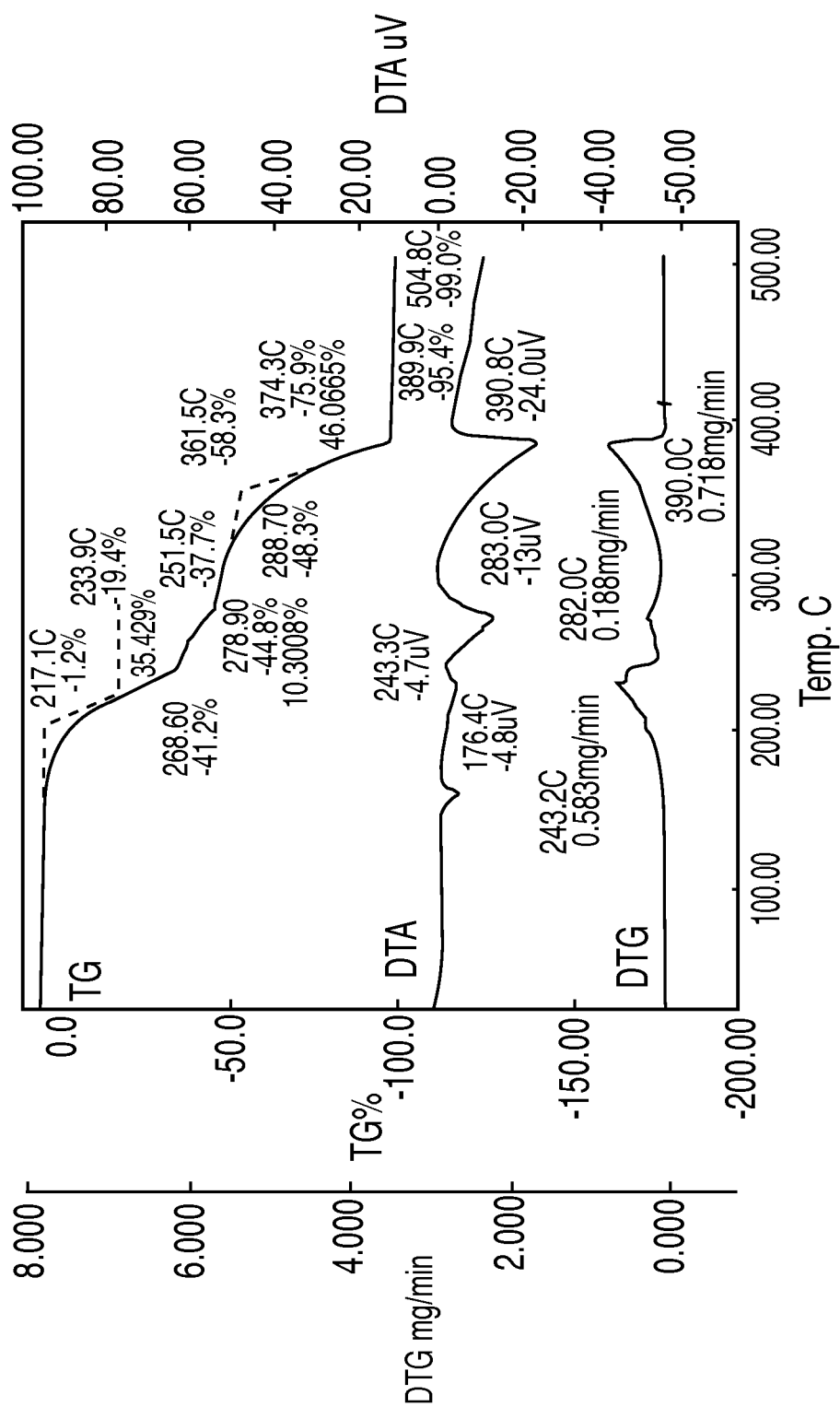
FIG. 3 is a thermogram of DTG and DTA as a function of temperature for one of our ammonium nitrate composites.
Figure 4:
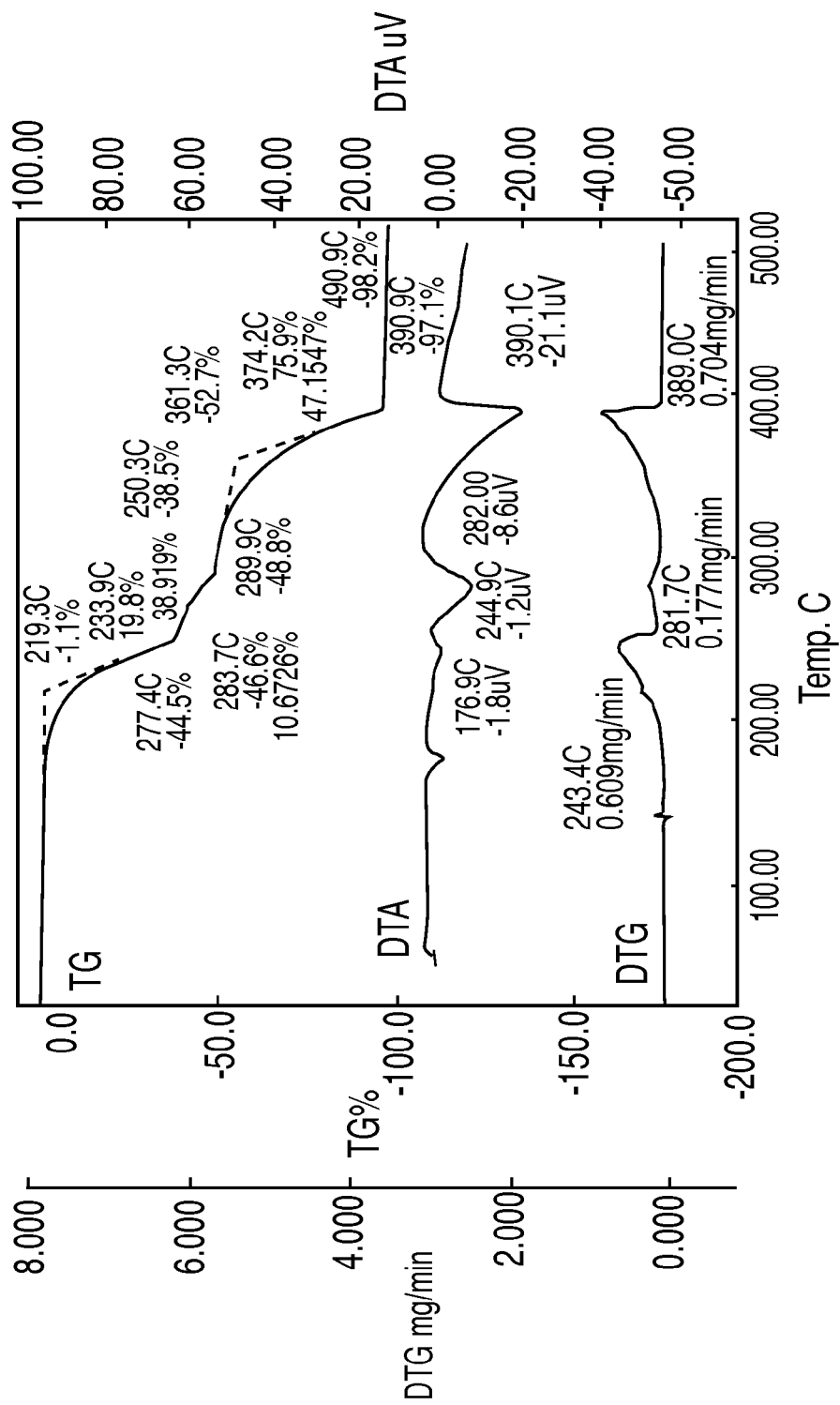
FIG. 4 is a thermogram of DTG and DTA as a function of temperature for another one of our ammonium nitrate composites.
Figure 5:
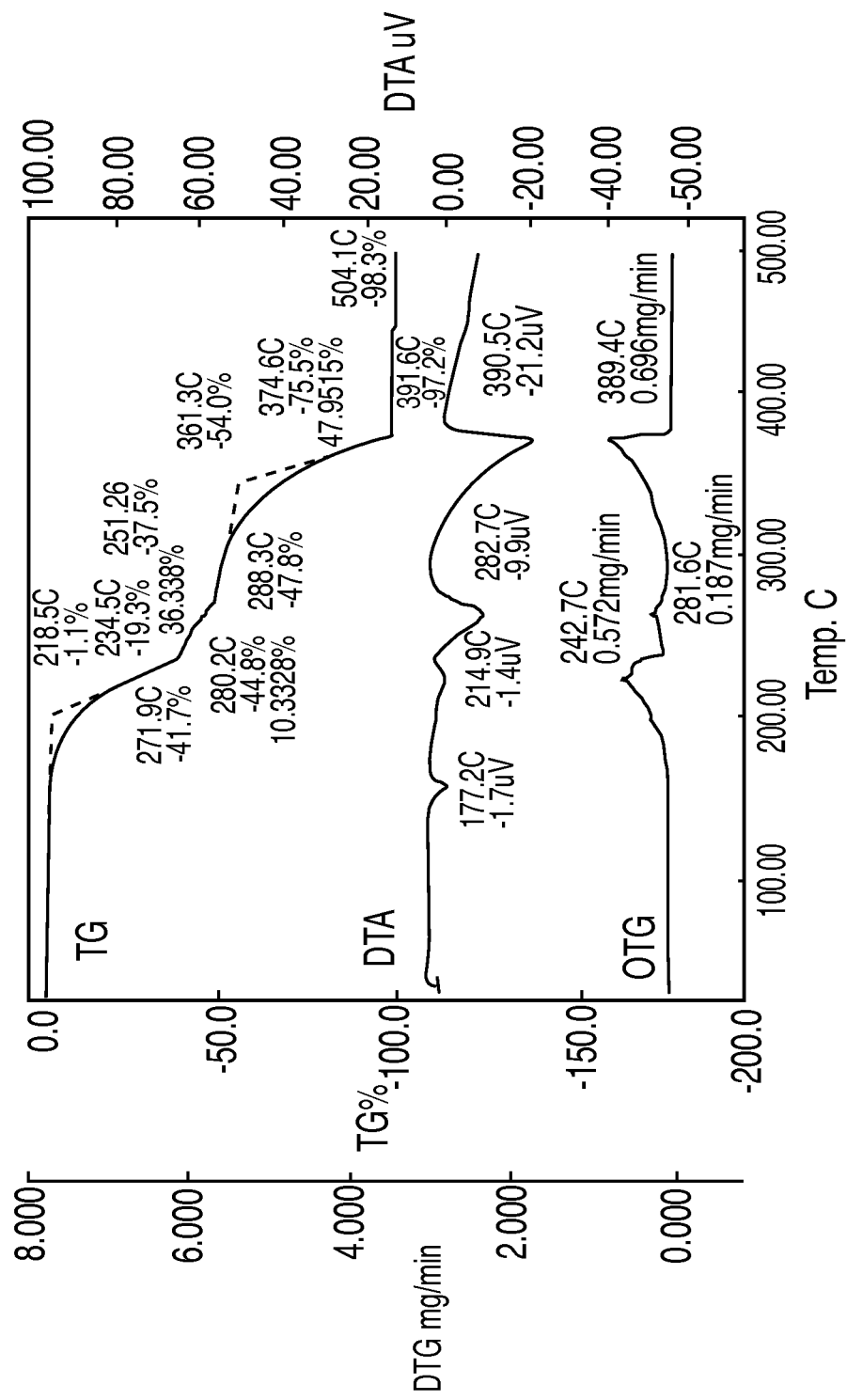
FIG. 5 is a thermogram of DTG and DTA as a function of temperature for yet another one of our ammonium nitrate composites.
Figure 6:
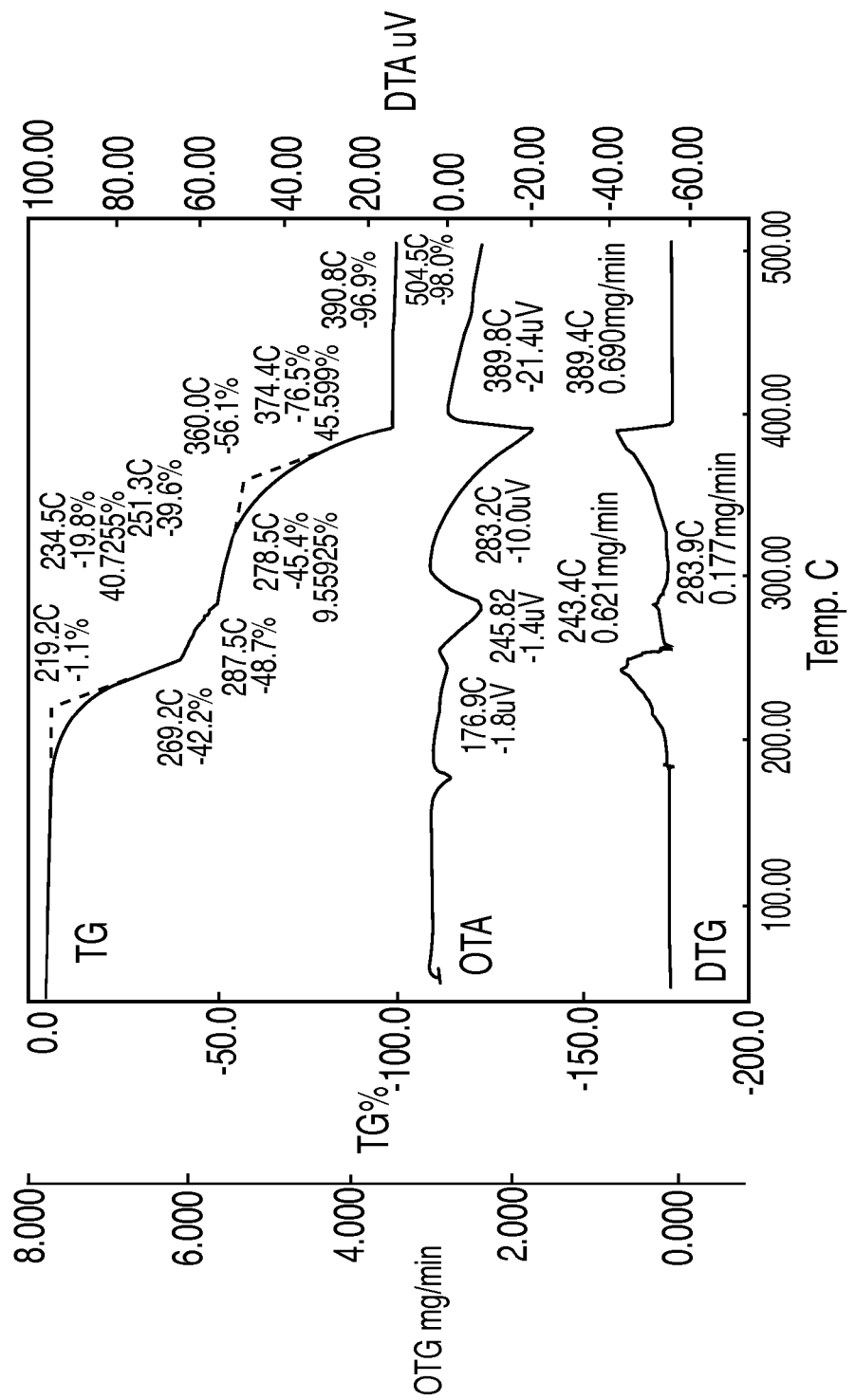
FIG. 6 is a thermogram of DTG and DTA as a function of temperature for still another one of our ammonium nitrate composites.

Fused ammonium nitrate sulfate (ANS) 1:2 double salt was tested using the same analytical equipment described in connection with Comparative Example 1. The resulting thermogram in FIG. 2 illustrates typical results from testing of 1:2 ANS double salt, showing its relative stability.

Example 1

A series of four (4) of our substantially identical ammonium nitrate composite samples (Spec #'s 1-4), which in this instance were substantially free of double salts, were tested using the same analytical equipment described in connection with Comparative Example 1. The thermogramic results are shown in Table 1 and FIGS. 3-6 and illustrate that these properties are similar to results from the 1:2 ANS double salt from Comparative Example 2.

TABLE 1

| Sample ID | Spec # | 1st Weight Lost Event ||||| 2nd Weight Lost Event |||||
|---|---|---|---|---|---|---|---|---|---|---|---|
| | | Onset Temp. (°C.) | Wt. Lost at Onset (%) | Endset Temp. (°C.) | Wt. Lost at Endset (%) | Wt. Lost (%) | Onset Temp. (°C.) | Wt. Lost at Onset (%) | Endset Temp. (°C.) | Wt. Lost at Endset (%) | Wt. Lost (%) |
| ASN (F = fuses) | 1 | 217.1 | 1.2 | 251.4 | 37.7 | 36.5 | 268.6 | 41.2 | 288.7 | 48.3 | 7.1 |
| ASN (F = fuses) | 2 | 219.3 | 1.1 | 250.3 | 38.5 | 37.4 | 277.4 | 44.5 | 289.9 | 48.8 | 4.3 |
| ASN (F = fuses) | 3 | 218.5 | 1.1 | 251.8 | 37.5 | 36.4 | 271.9 | 41.7 | 288.3 | 47.8 | 6.1 |
| ASN (F = fuses) | 4 | 219.2 | 1.1 | 251.3 | 38.6 | 37.5 | 269.2 | 42.2 | 278.5 | 45.4 | 3.2 |

| Sample ID | Spec # | 3rd Event or DTA |||||
|---|---|---|---|---|---|---|
| | | Onset Temp. (°C.) | Wt. Lost at Onset (%) | Endset Temp. (°C.) | Wt. Lost at Endset (%) | Wt. Lost (%) | Final Weight Lost (%) |
| ASN (F = fuses) | 1 | 361.5 | 56.3 | 389.3 | 95.4 | 39. | 99.0 |
| ASN (F = fuses) | 2 | 361.3 | 54.7 | 390.9 | 97.1 | 42.4 | 98.2 |
| ASN (F = fuses) | 3 | 361.3 | 54.0 | 391.6 | 97.2 | 43.2 | 98.3 |
| ASN (F = fuses) | 4 | 360.0 | 56.1 | 390.8 | 96.9 | 40.8 | 98.0 |

| Sample ID | Spec # | DTA endotherms |||| DTG |||
|---|---|---|---|---|---|---|---|---|
| | | Melt Point (°C.) | Wt Loss 1 (°C.) | Wt Loss 2 (°C.) | Wt Loss 3 (°C.) | Wt Loss 1 Temp. (°C.) | Wt Loss 2 Temp. (°C.) | Wt Loss 3 Temp. (°C.) |
| ASN (F = fuses) | 1 | 176.4 | 243.3 | 283.0 | 390.6 | 243.2 | 282.0 | 390.0 |
| ASN (F = fuses) | 2 | 176.9 | 244.9 | 282.0 | 390.1 | 243.4 | 281.7 | 389.00 |
| ASN (F = fuses) | 3 | 177.2 | 241.9 | 282.7 | 390.5 | 242.7 | 281.6 | 389.4 |
| ASN (F = fuses) | 4 | 176.9 | 245.6 | 283.2 | 389.8 | 243.4 | 283.9 | 389.4 |

TGA Instrument:  Purge Gas: ☐ Nitrogen ☒ Air ☐ Oxygen
    ☐ Nitrogen to 600° C., Air 600-900° C.
Heating Range: ° C. to 500° C.  Sample Conditioning: ☒ As-Received ☐ Vacuum Dried
Heating Rate: ° C./min  Sample Holder: Al pan  Sample Size: 10 mg

Example 2

Figure 7:
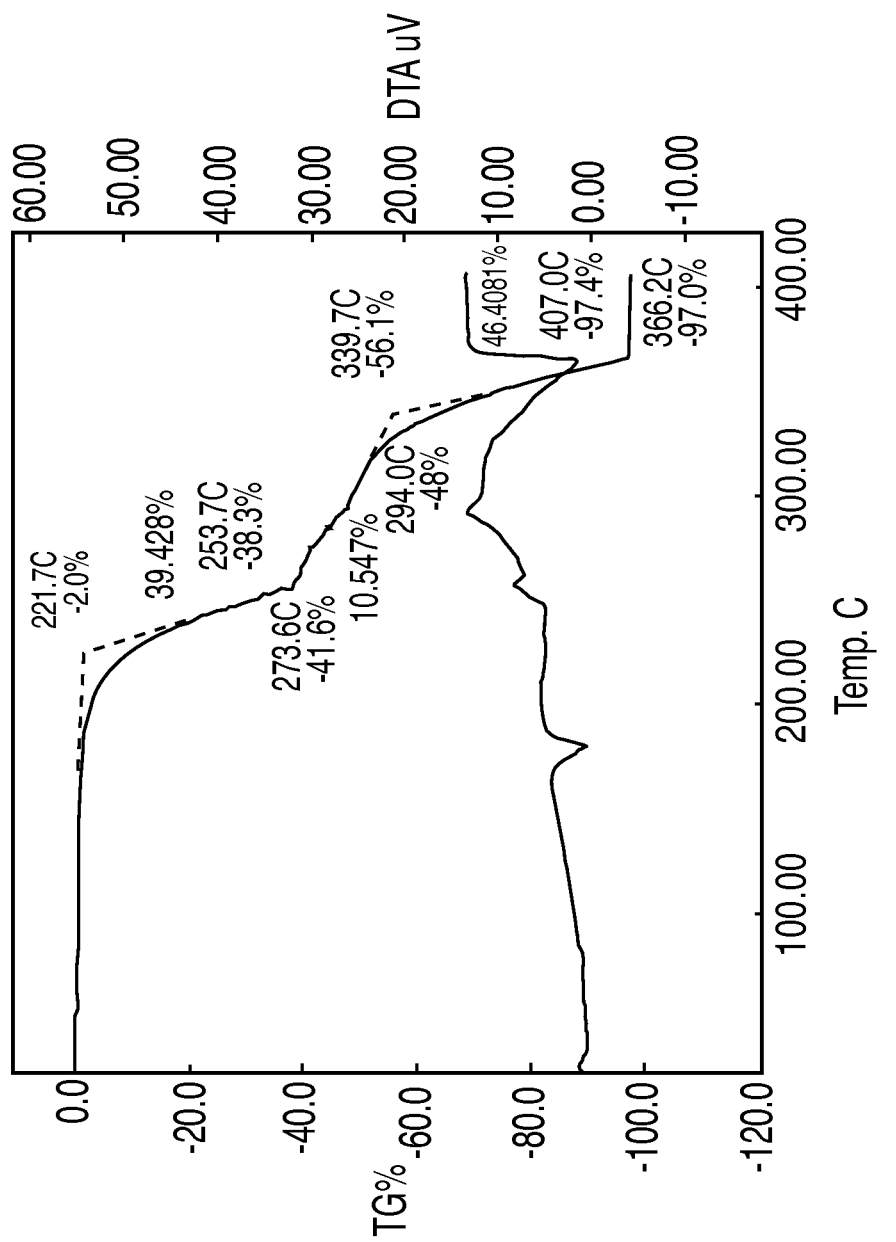
FIG. 7 is a thermogram of DTG and DTA as a function of temperature for still another one of our ammonium nitrate composites.
Figure 8:
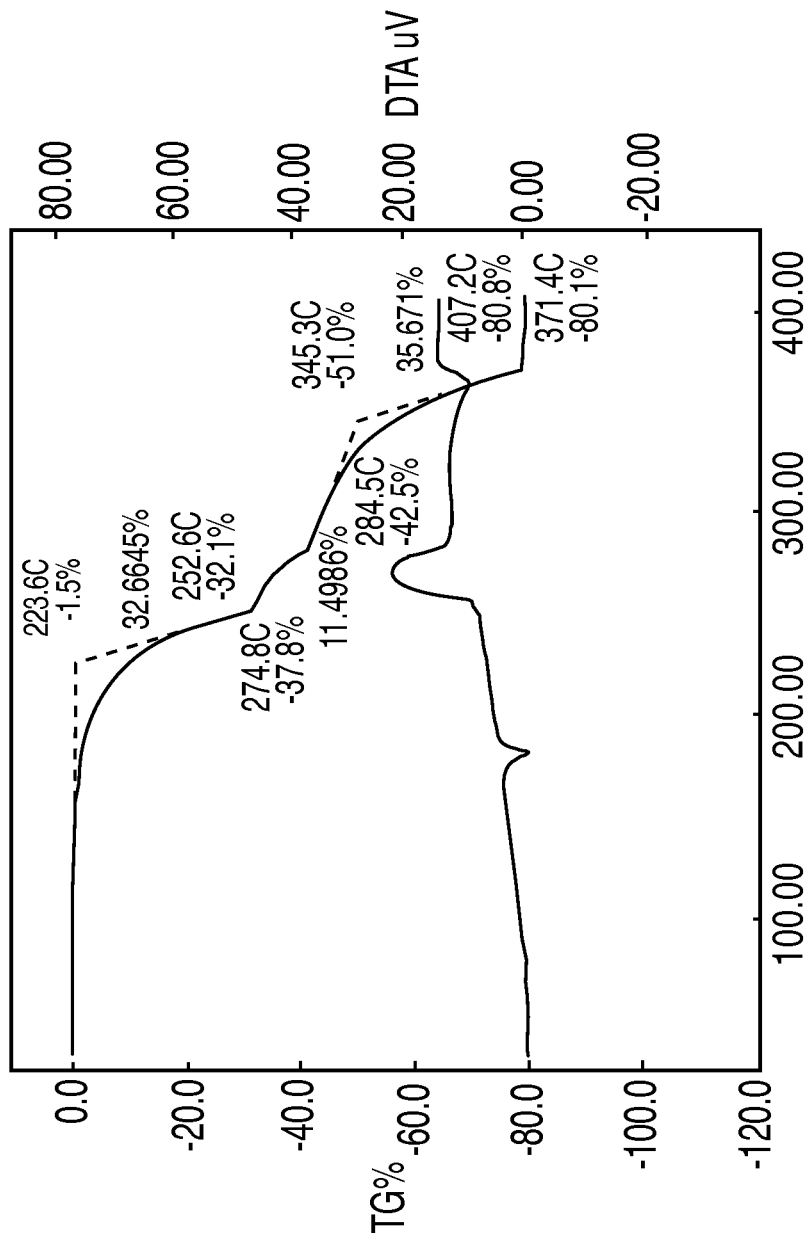
FIG. 8 is a thermogram of DTG and DTA as a function of temperature for still another one of our ammonium nitrate composites.

A series of two (2) of our ammonium composite samples (Run #'s 1-2) were formed into pellets and then tested using the same analytical equipment. The thermogramic results are shown in Table 2 and FIGS. 7-8.

TABLE 2

| Sample ID | Run # | 1st Weight Lost Event | | | | | 2nd Weight Lost Event | | | | |
|---|---|---|---|---|---|---|---|---|---|---|---|
| | | Onset Temp. (°C.) | Wt. Lost at Onset (%) | Endet Temp. (°C.) | Wt. Lost at Endset (%) | Wt. Lost (%) | Onset Temp. (°C.) | Wt. Lost at Onset (%) | Endet Temp. (°C.) | Wt. Lost at Endset (%) | Wt. Lost (%) |
| ASN Pellet | 1 | 221.7 | 2.0 | 253.7 | 38.3 | −36.3 | 273.6 | 41.6 | 294.0 | 48.0 | −6.4 |
| ASN Pellet | 2 | 223.6 | 1.5 | 252.6 | 32.1 | −30.6 | 274.8 | 37.8 | 284.5 | 42.5 | −4.7 |

| Sample ID | Run # | 3rd Event or DTA Results | | | | |
|---|---|---|---|---|---|---|
| | | Onset Temp. (°C.) | Wt. Lost at Onset (%) | Endet Temp. (°C.) | Wt. Lost at Endset (%) | Wt. Lost (%) | Final Weight Lost (%) |
| ASN Pellet | 1 | 339.7 | 56.1 | 366.2 | 97.0 | −40.9 | 97.4 |
| ASN Pellet | 2 | 345.3 | 51.0 | 371.4 | 80.1 | −29.1 | 80.6 |

TGA Instrument: Seiko RTG 220U  
Heating Range: 30° C. to 400° C.  
Heating Rate: 5° C./min  
Purge Gas: ☐ Nitrogen ☑ Air ☐ Oxygen ☐ Nitrogen to 600° C., Air 600-900° C.  
Sample Conditioning: ☑ As-Received ☐ Vacuum Dried  
Sample Holder: pt  Sample Size: 10 mg

What is claimed is:

1. A method of forming stable ammonium nitrate composite material comprising:
   (a) blending ammonium nitrate having an average particle diameter greater than about 1 mm and a substantially non-oxidizing compound having an average particle diameter of about 1,000 μm or less; and
   (b) reducing the average size of said ammonium nitrate in the presence of said non-oxidizing compound to produce a substantially homogeneous blend of ammonium nitrate and said non-oxidizing compound having an average particle diameter of about 1 to about 1,000 μm to form a substantially non-explosive powder.

2. The method of claim 1, wherein said non-oxidizing compound is at least one selected from the group consisting of non-oxidative or low-oxidative ammonium salts, non-oxidative or low-oxidative calcium salts, non-oxidative or low-oxidative potassium salts, and other non-oxidative or low-oxidative salts.

3. The method of claim 1, wherein said non-oxidizing compound is at least one selected from the group consisting of ammonium sulfate, ammonium phosphate, ammonium molybdenate, ammonium hexafluorosilicate, calcium nitrate, calcium carbonate, magnesium nitrate, potassium nitrate, and potassium phosphate.

4. The method of claim 1, wherein the mole ratio of ammonium nitrate to the non-oxidizing compound is from about 0.8:1 to about 1.2:1.

5. The method of claim 4, further comprising contacting the substantially non-explosive powder with a non-thermoreactive acid or a mixture of acid under ammoniating conditions such that ammonium sulfate at least partially covers or coats particles or groups of particles and causes agglomeration or growth of particles to further stabilize the substantially non-explosive powder.

6. The method of claim 1, wherein the non-oxidizing compound is less than or equal to about 0.2 wt. % organic impurities.

7. The method of claim 1, further comprising contacting the substantially non-explosive powder with a non-thermoreactive acid or a mixture of acid under ammoniating conditions such that ammonium sulfate at least partially covers or coats particles or groups of particles and causes agglomeration or growth of particles to further stabilize the substantially non-explosive powder.

8. The method of claim 1, wherein the non-explosive powder is substantially free of ammonium nitrate sulfate double salts.

9. A method of forming stable ammonium nitrate composite material comprising:
   (a) reducing the average size of ammonium nitrate having an average particle diameter greater than about 1 mm; and
   (b) blending said ammonium nitrate with a substantially non-oxidizing compound having an average particle diameter of about 1,000 μm or less to produce a substantially homogeneous blend of ammonium nitrate and said non-oxidizing compound having an average particle diameter of about 1 to about 1,000 μm to form a substantially non-explosive powder.

10. The method of claim 9, wherein said non-oxidizing compound is at least one selected from the group consisting of non-oxidative or low-oxidative ammonium salts, non-oxidative or low-oxidative calcium salts, non-oxidative or low-oxidative potassium salts, and other non-oxidative or low-oxidative salts.

11. The method of claim 9, wherein said non-oxidizing compound is at least one selected from the group consisting of ammonium sulfate, ammonium phosphate, ammonium molybdenate, ammonium hexafluorosilicate, calcium nitrate, calcium carbonate, magnesium nitrate, potassium nitrate, and potassium phosphate.

12. The method of claim 9, wherein the mole ratio of ammonium nitrate to the non-oxidizing compound is from about 0.8:1 to about 1.2:1.

13. The method of claim 9, wherein the non-oxidizing compound is less than or equal to about 0.2 wt. % organic impurities.

14. The method of claim 9, wherein the non-explosive powder is substantially free of ammonium nitrate sulfate double salts.

15. The method of claim 1, further comprising the additional step of compacting the substantially homogeneous blend.

16. The method of claim 1, further comprising the additional step of granulating the substantially homogeneous blend.

17. The method of claim 1, wherein the mole ratio of ammonium nitrate to the non-oxidizing compound in the substantially homogeneous blend is about 1:1.

18. The method of claim 9, further comprising the additional step of compacting the substantially homogeneous blend.

19. The method of claim 9, further comprising the additional step of granulating the substantially homogeneous blend.

20. The method of claim 9, wherein the mole ratio of ammonium nitrate to the non-oxidizing compound in the substantially homogeneous blend is about 1:1.

* * * * *